United States Patent
Mizunaga et al.

(10) Patent No.: US 9,540,085 B2
(45) Date of Patent: Jan. 10, 2017

(54) OCEAN EXPLORATION APPARATUS AND OCEAN EXPLORATION METHOD

(71) Applicant: YBM CO., LTD., Karatsu-shi, Saga-ken (JP)

(72) Inventors: Hideki Mizunaga, Fukuoka (JP); Satoru Yamaguchi, Fukuoka (JP)

(73) Assignee: YBM CO., LTD., Karatsu-shi (JP)

(*) Notice: Subject to any disclaimer, the term of this patent is extended or adjusted under 35 U.S.C. 154(b) by 0 days.

(21) Appl. No.: 14/745,801

(22) Filed: Jun. 22, 2015

(65) Prior Publication Data

US 2016/0001860 A1 Jan. 7, 2016

Related U.S. Application Data

(60) Provisional application No. 62/019,438, filed on Jul. 1, 2014.

(51) Int. Cl.

| G01V 1/30 | (2006.01) |
|---|---|
| G01V 1/38 | (2006.01) |
| B63G 8/00 | (2006.01) |
| B63G 8/14 | (2006.01) |
| G01V 3/15 | (2006.01) |
| B63H 19/04 | (2006.01) |

(52) U.S. Cl.
CPC ............... *B63G 8/001* (2013.01); *B63G 8/14* (2013.01); *B63H 19/04* (2013.01); *G01V 1/30* (2013.01); *G01V 1/38* (2013.01); *G01V 3/15* (2013.01); *B63G 2008/004* (2013.01); *Y02T 70/59* (2013.01)

(58) Field of Classification Search
CPC ............. B63G 8/00; B63G 8/001; B63G 8/14; B63G 2008/004; G01V 3/15; G01V 3/40; G01V 1/30; G01V 1/38

USPC ............... 114/331; 367/21; 701/21, 23
See application file for complete search history.

(56) References Cited

U.S. PATENT DOCUMENTS

| 8,754,649 B2* | 6/2014 | Sudow | G01V 1/3835 324/334 |
|---|---|---|---|
| 9,140,814 B2* | 9/2015 | Welker | G01V 1/3843 |
| 2010/0294192 A1* | 11/2010 | Herbek | B63G 8/14 114/331 |
| 2013/0032078 A1* | 2/2013 | Yahnker | B63G 8/001 114/331 |
| 2013/0305978 A1* | 11/2013 | Glezer | B63G 8/001 114/330 |

OTHER PUBLICATIONS

OBEM: Ocean Bottom Electromagnetometer Retrieved from the Internet: <http://obem.jpn.org/obem/obem025.html>.

* cited by examiner

*Primary Examiner* — Lars A Olson
(74) *Attorney, Agent, or Firm* — Oliff PLC

(57) ABSTRACT

An ocean exploration apparatus including: a probe body; a buoyancy adjusting section that adjusts buoyancy generated in the probe body; a posture adjusting section that adjusts a posture of the probe body; a position information acquiring section that acquires position information of the probe body; a wing section that moves the probe body using a lifting force applied from seawater; a sensor section that is provided in the probe body and measures an electromagnetic field; and a control section that controls operations of the buoyancy adjusting section, the posture adjusting section, the position information acquiring section, and the sensor section according to predetermined conditions.

6 Claims, 4 Drawing Sheets

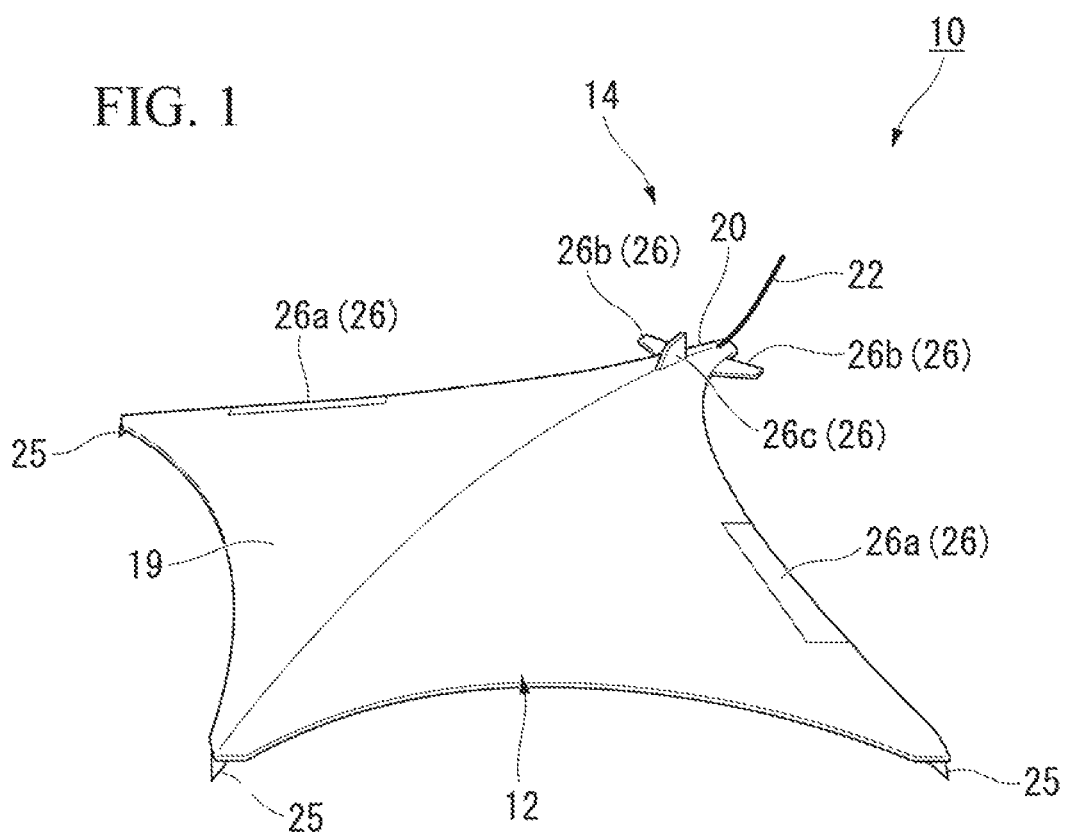

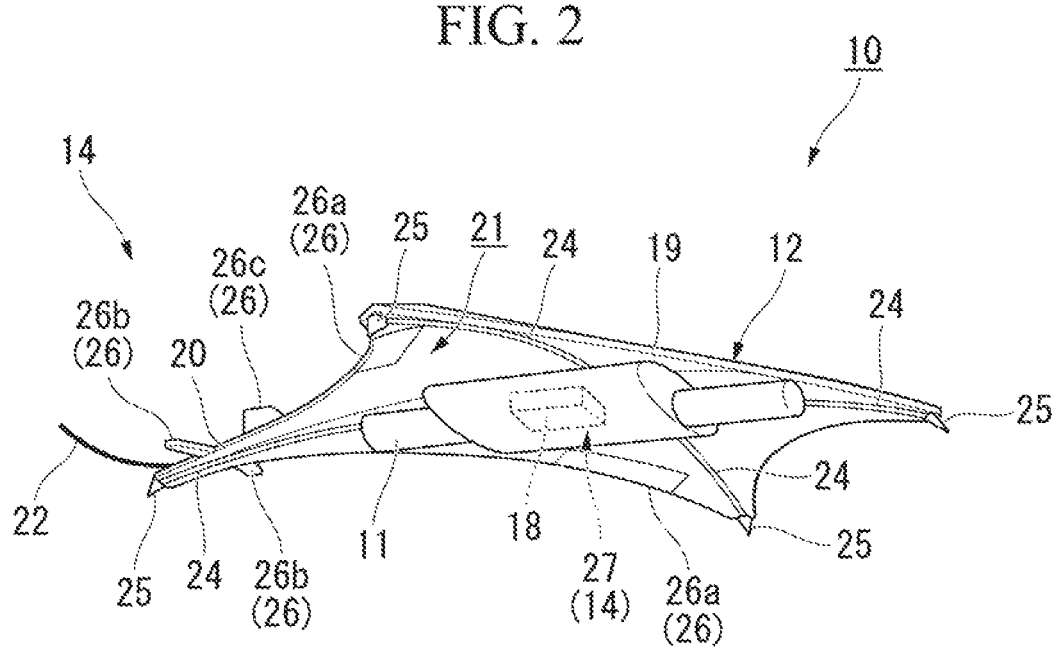
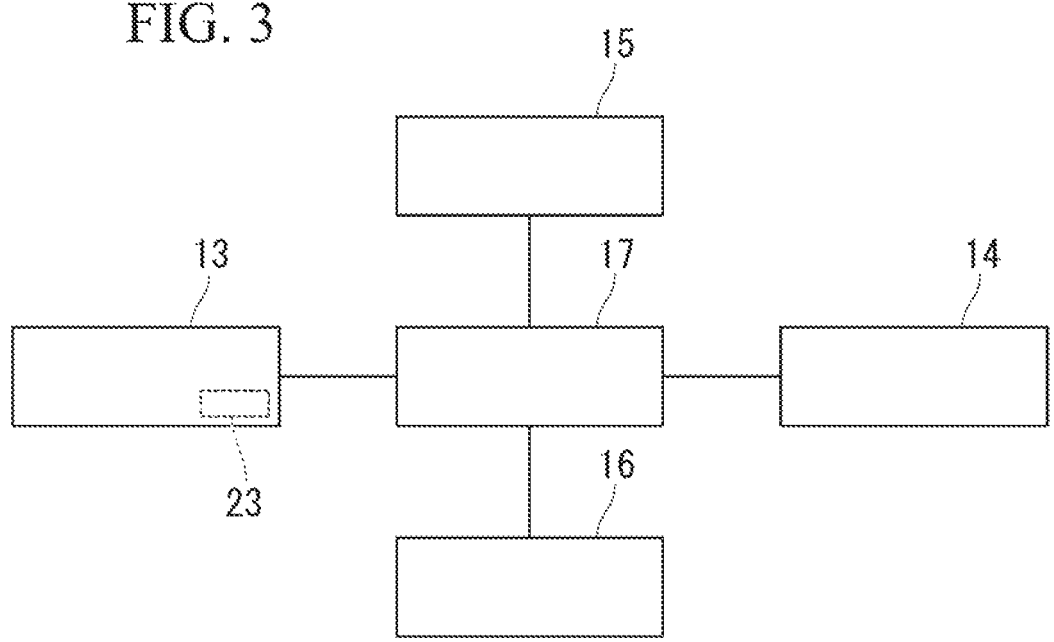

OCEAN EXPLORATION APPARATUS AND OCEAN EXPLORATION METHOD

This invention claims priority based on U.S. Patent Provisional Application No. 62/019,438 filed Jul. 1, 2014, the contents of which are herein incorporated by reference.

BACKGROUND OF THE INVENTION

1. Field of the Invention

The present invention relates to an ocean exploration apparatus and an ocean exploration method.

2. Description of Related Art

In the related art, an ocean bottom electromagnetometer (OBEM) as disclosed in URL: http://obem.jpn.org/obem/obem025.html (GOTO, Tadanori "A Marine EM Researcher") is known. The ocean bottom electromagnetometer is an ocean bottom installation type measurement apparatus used for exploration of an ocean bottom electromagnetic field, and measures an electric field and a magnetic field (electromagnetic field) that change over time. The ocean bottom electromagnetometer detects a feeble electric potential difference on the ocean bottom using arms with a length of 5 to 6 m on both sides. An electrode for electric potential difference measurement, such as a Ag—AgCl non-polarizing electrode, is attached to an endpoint of each arm.

The ocean bottom electromagnetometer is towed in a state of being connected to a mother ship to be transported offshore, and then, is dropped down to the ocean bottom due to the weight thereof as the connection with the mother ship is released. Then, the ocean bottom electromagnetometer measures an electromagnetic field on the ocean bottom. The ocean bottom electromagnetometer includes an anchor, and after the measurement is finished, the ocean bottom electromagnetometer is lifted up and recovered as the anchor is separated based on a signal from the mother ship.

However, in the ocean bottom electromagnetometer of the related art, the dropping and recovery work of the ocean bottom electromagnetometer causes a burden, which causes a problem when performing exploration in a broad sea area.

In consideration of the above-mentioned problems, an object of the invention is to provide a technique capable of realizing efficient exploration.

SUMMARY OF THE INVENTION

In order to solve the above-mentioned problems, the invention proposes the following means.

According to a first aspect of the invention, there is provided an ocean exploration apparatus including: a probe body; a buoyancy adjusting section that adjusts buoyancy generated in the probe body; a posture adjusting section that adjusts a posture of the probe body; a position information acquiring section that acquires position information of the probe body; a wing section that moves the probe body using a lifting force applied from seawater; a sensor section that is provided in the probe body and measures an electromagnetic field; and a control section that controls operations of the buoyancy adjusting section, the posture adjusting section, the position information acquiring section, and the sensor section according to predetermined conditions.

According to a second aspect of the invention, in the ocean exploration apparatus according to the first aspect the sensor section includes an MI sensor.

According to a third aspect of the invention, in the ocean exploration apparatus according to the first or second aspect, the wing section is formed as a glider type.

According to a fourth aspect of the invention, in the ocean exploration apparatus according to any one of the first to third aspects, the sensor section detects the electromagnetic field through an electrode provided at an endpoint of an arm that protrudes from the probe body in a horizontal direction, and at least a part of the arm overlaps the wing section in a vertical direction.

According to a fifth aspect of the invention, in the ocean exploration apparatus according to any one of the first to fourth aspects, the position information acquiring section acquires a position and a direction of the probe body as the position information.

According to a sixth aspect of the invention, there is provided an ocean exploration method for measuring an electromagnetic field on an ocean bottom using the ocean exploration apparatus according to any one of the first to fifth aspects, the method including: adjusting a velocity and a direction where the probe body moves in the sea by the lifting force applied to the wing section from the seawater and causing the probe body to perform self-contained navigation toward a measurement point, by controlling the buoyancy adjusting section and the posture adjusting section by the control section, and measuring the electromagnetic field by controlling the sensor section by the control section after the probe body performs the self-contained navigation to the measurement point, in which in performing the self-contained navigation, the velocity and the direction are adjusted based on the position information of the probe body acquired by the position information acquiring section and position information of the measurement point which is a predetermined condition.

BRIEF DESCRIPTION OF THE DRAWINGS

FIG. 1 is a top perspective view of an ocean exploration apparatus according to a first embodiment of the invention.

FIG. 2 is a bottom perspective view of the ocean exploration apparatus shown in FIG. 1.

FIG. 3 is a control block diagram schematically illustrating the ocean exploration apparatus shown in FIG. 1.

Figure 4:
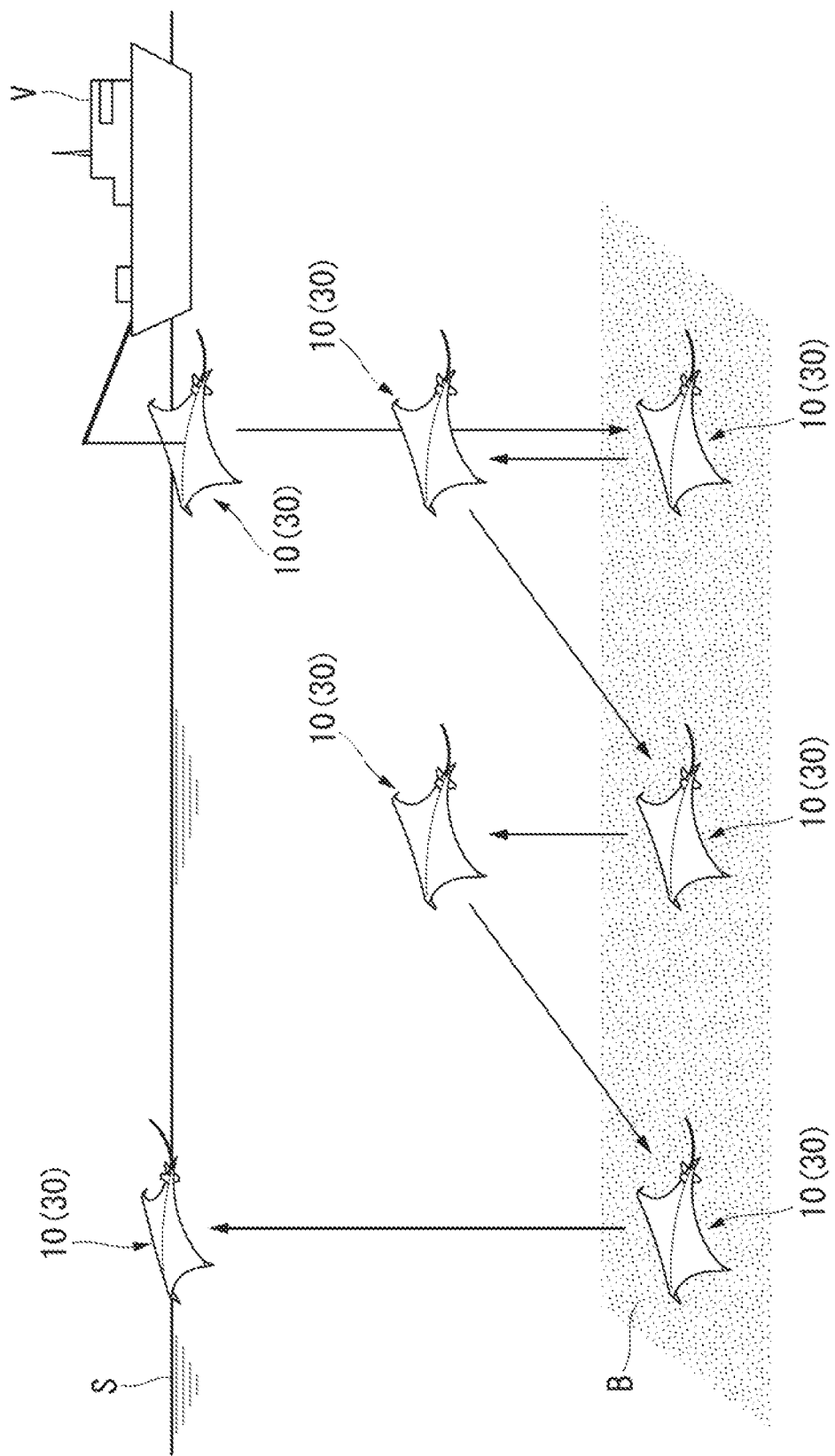
FIG. 4 is a diagram schematically illustrating an ocean exploration method using the ocean exploration apparatus shown in FIG. 1.

DETAILED DESCRIPTION OP THE INVENTION (First Embodiment)

Hereinafter, an ocean exploration apparatus 10 according to a first embodiment of the invention will be described with reference to the accompanying drawings. The ocean exploration apparatus 10 is a glider type autonomous underwater vehicle (AUV) observation system mounted with a small magnetic sensor and is an autonomous underwater vehicle that explores an electromagnetic field of the ocean (marine magnetotelluric method (MT) AUV: MaMTA).

As shown in FIGS. 1 to 3, the ocean exploration apparatus 10 includes a probe body 11, a wing section 12, a sensor section 13, a posture adjusting section 14, a buoyancy adjusting section 15, a position information acquiring section 16, and a control section 17.

The probe body 11 is formed in a flat box shape. The probe body 11 is formed in a rectangular shape in which side portions extend along both of a longitudinal direction and a transverse direction in a planar view. A power source 18 is built into the probe body 11. For example, a battery or the like may be used as the power source 18.

The wing section 12 moves the probe body 11 using a lifting force applied from seawater. The wing section 12 is formed as a glider type and is able to glide by receiving the lifting force from the seawater when changing route including dropping based on the weight of the ocean exploration apparatus 10 without turning or pitch adjustment, which is different from a propeller type, or the like. The wing section 12 is able to move the probe body 11 to follow a sea current.

The wing section 12 is generally formed in a wing shape, and in the shown example, the wing section 12 forms a rectangular shape in which corner portions are disposed in both of the longitudinal direction and the transverse direction in a planar view. The wing section 12 covers the probe body 11 from above, and the probe body 11 is fixed to a lower surface of the wing section 12. The wing section 12 includes a main wing 19, and a tail wing 20. The tail wing 20 is configured by a corner portion disposed rearward in a planar view in the wing section 12, and the main wing 19 is configured by a portion of the wing section 12 excluding the tail wing 20. The tail wing 20 protrudes rearward from the main wing 19.

The main wing 19 is curved upward to form a convex spherical shape, and thus, an accommodating space 21 in which at least part of the probe body 11 is accommodated is formed under the main wing 19.

An antenna 22 that protrudes rearward is provided in the tail wing 20. The antenna 22 gradually extends upward as it goes rearward, and at least a tip portion of the antenna 22 protrudes out of the sea when the ocean exploration apparatus 10 is lifted up on a sea surface S.

The wing section 12 may be formed by a rigid member or a membrane, for example.

The sensor section 13 is provided in the probe body 11, and measures an electromagnetic field. The sensor section 13 is configured by a small tri-axial magnetic sensor that measures a geomagnetic field, and is accommodated in the probe body 11. The sensor section 13 includes an MI sensor 23. The MI sensor 23 measures an electromagnetic field using a magnetic impedance effect. The MI sensor 23 may be accommodated in a measurement box of which the length of one side is about 0.2 m, and from which an electric field measurement connector protrudes.

The sensor section 13 detects an electromagnetic field through an electrode 25 provided at an endpoint of an arm 24 that protrudes from the probe body 11 in a horizontal direction.

The arm 24 is formed to have a length of about 5 m. Further, a pair of the arms 24 protrudes from the probe body 11 in the longitudinal direction, and another pair of the arms 24 protrudes in the transverse direction. Four arms 24 are provided at intervals in a circumferential direction which is a turning direction around the probe body 11 in a planar view. At least a part of the arms 24 overlaps the wing section 12 in a vertical direction. In the present embodiment, the arm 24 is covered by the wing section 12 from above over the entire length thereof. The arm 24 is disposed along a lower surface of the wing section 12 and is fixed to the lower surface. For example, when the wing section 12 is formed by a membrane, it is possible to reinforce the wing section 12 by the arm 24.

The electrode 25 is electrically connected to the connector. The electrode 25 is formed in a sharp tip shape that protrudes downward from the endpoint of the arm 24, and extends further downward with respect to the probe body 11. The electrode 25 is used for electric potential difference measurement, and may employ a non-polarizing electrode such as a Ag—AgCl non-polarizing electrode, for example.

It is preferable that the electrode 25 is grounded on an ocean bottom B in measurement of the electromagnetic field. Thus, for example, a tip portion of the arm 24 may be formed to be deformed downward in grounding of the ocean exploration apparatus 10. Such a configuration may be realized by providing a rotary joint in the arm 24, for example. Here, in consideration of the lifting force or the like applied to the wing section 12, it is preferable to regulate excessive upward deformation of the arm 24.

The posture adjusting section 14 adjusts the posture of the probe body 11. The posture adjusting section 14 includes an auxiliary wing 26 (moving wing) provided in the wing section 12, and a gravity center adjusting section 27 that adjusts the center of gravity of the probe body 11.

The auxiliary wing 26 includes a first auxiliary wing 26a that is provided in the main wing 19, and a second auxiliary wing 26b and a third auxiliary wing 26c that are provided in the tail wing 20.

The first auxiliary wing 26a is provided as a pair on right and left sides of a rear portion of the main wing 19, and rotates around a first rotation axis that extends in the transverse direction. The first auxiliary wing 26a functions as an aileron that banks (overturns or rolls) the wing section 12 around a longitudinal axis that extends in the longitudinal direction.

The second auxiliary wing 26b is provided as a pair to protrude from the tail wing 20 in the transverse direction, and rotates around a second rotation axis that extends in the transverse direction. The second auxiliary wing 26b functions as an elevator that rotates the wing section 12 around a transverse axis that extends in the transverse direction.

The third auxiliary wing 26c protrudes upward from the tail wing 20, and rotates around a third rotation axis that extends in the vertical direction. The third auxiliary wing 26c functions as a rudder that rotates the wing section 12 around a vertical axis that extends in the vertical direction.

The gravity center adjusting section 27 moves an article accommodated in the probe body 11 to adjust the center of gravity. The gravity center adjusting section 27 may move the power source 18 as the accommodated article, for example.

The buoyancy adjusting section 15 adjusts buoyancy generated in the probe body 11, and controls the weight of the probe body 11 in the water. A known buoyancy adjustment device may be employed as the buoyancy adjusting section 15. Here, in consideration of a case where the ocean exploration apparatus 10 is used in the deep sea, it is preferable to employ a configuration in which a liquid (water or oil) is used, compared with a configuration in which a gas (air) is used.

The position information acquiring section 16 acquires position information of the probe body 11. The position information acquiring section 16 acquires the position and direction of the probe body 11 as the position information. A configuration in which a compass and an inertial navigation system are provided may be employed as the position information acquiring section 16, for example. In this case, the position information acquiring section 16 acquires position information by GPS at a reference position (for example, the position of a mother ship V) on the sea, for example, and then, measures a relative position from the reference position by the compass and the inertial navigation system, to thereby acquire the position information of the probe body 11. For example, a magnetic compass, a gyro compass, or the like may be employed as the compass.

It is preferable that the position information acquiring section 16 further includes a water depth detection sensor that detects a water depth position. Thus, it is possible to acquire the position of the probe body 11 in a three-dimensional manner. This type of sensor may be configured by providing a pressure sensor (water pressure sensor), in addition to a geomagnetic sensor and an acceleration sensor, to the inertial navigation system. Further, a sensor that acoustically measures a distance from the ocean bottom B may be employed as the water depth detection sensor.

An acoustic doppler current profiler (ADCP) may be provided in the position information acquiring section 16, or may be employed together with the position information acquiring section 16. Further, a device that measures a relative position from the mother ship V (for example, a super short baseline (SSBL) or the like) may be provided in the position information acquiring section 16, or may be employed together with the position information acquiring section 16.

The control section 17 controls operations of the buoyancy adjusting section 15, the posture adjusting section 14, the position information acquiring section 16, and the sensor section 13 according to a predetermined condition. Position information or the like about a target measurement point may be used as the predetermined condition, for example.

Energy necessary for the operations of the respective components including the control section 17 is supplied from the above-described power source 18.

Next, respective methods of self-contained navigation, acquisition of position information, and measurement of an electromagnetic field using the ocean exploration apparatus 10 will be described with reference to FIGS. 1 to 4.

(Self-Contained Navigation)

A vehicle which is the probe body 11 is provided with a buoyancy adjuster (buoyancy adjusting section 15) that controls the underwater weight of an apparatus body, and switches respective states of dropping and rising to glide in the water for advancing. At the same time, the posture adjusting section 14 controls the main wing 19 and the auxiliary wings 26 mounted on the tail wing 20 to control the posture of the apparatus body, and as a result, the probe body 11 is grounded at a desired point on the ocean bottom B. An energy source is a battery (power source 18) built into the apparatus body. Thus, the glider type AUV (ocean exploration apparatus 10) is capable of performing self-contained navigation.

When controlling the posture of the apparatus body, it is preferable that the posture adjusting section 14 perform movement of the center of gravity by the above-described gravity center adjusting section 27.

(Acquisition of Position Information)

The position information acquiring section 16 starts navigation with reference to position information measured by GPS on the sea, and recognizes a position or a traveling direction of the host apparatus using a compass and an inertial navigation system (method in which a geomagnetic sensor and an acceleration sensor are used together) in the sea. Further, when recognizing the position or the traveling direction of the host apparatus, the position information acquiring section 16 uses super-short baseline (SSBL) positioning as necessary. Communication with an external device is performed in a wireless manner using radio waves at the sea level S. Thus, the glider type AUV (ocean exploration apparatus 10) can obtain position information necessary for self-contained navigation.

When acquiring the position of the probe body 11, since the position is acquired in a three-dimensional manner, it is preferable that the position information acquiring section 16 further includes the above-described water depth detection sensor.

(Measurement of Electromagnetic Field)

The MI sensor 23 using a magnetic impedance effect, instead of an induction coil employed in the OBEM (Ocean Bottom Electromagnetometer) in the related art, is used as a small magnetic sensor (sensor section 13). The MI sensor 23 has a feature of excellent sensitivity at a low frequency whereas the induction coil shows a disadvantage. The reason why the small MI sensor 23 is used as the sensor is based on consideration of both the weight reduction of the apparatus body and sensitivity of a low frequency magnetic field which is an observation target.

Next, an example of an ocean exploration method for measuring an electromagnetic field of the ocean bottom B using the ocean exploration apparatus 10 will be described with reference to FIGS. 1 to 4.

The measurement of the electromagnetic field is performed as the apparatus body is grounded on the ocean bottom B. That is, the measurement is performed through processes of 1) starting from the sea, 2) performing self-contained navigation to move to a measurement point on the ocean bottom B, 3) measuring an electromagnetic field at the measurement point after grounding, and 4) floating up to the sea surface after finishing the measurement (or moving to the next measurement point). The ocean exploration apparatus 10 is provided with a geomagnetic sensor and an acceleration sensor (position information acquiring section 16), in addition to the sensor (sensor section 13) that measures the electromagnetic field, to measure the direction or position of the apparatus body during self-contained navigation or after grounding.

The glider type AUV (ocean exploration apparatus 10) goes underwater, performs electromagnetic field measurement for about one day at the measurement point designated on the ocean bottom B, and then, floats up to the sea level S after the measurement is finished to transmit data. Thereafter, the glider type AUV goes underwater to the next measurement point, and repeats the electromagnetic field measurement in a designated sea area.

That is, when measuring the electromagnetic field at the specific measurement point of the ocean bottom B using the ocean exploration apparatus 10, the control section 17 controls the buoyancy adjusting section 15 and the posture adjusting section 14 to adjust the buoyancy of the probe body 11, to control the weight in the water, and to adjust the posture of the probe body 11. Thus, it is possible to adjust a velocity and a direction for moving the probe body 11 in the water by a filling force applied to the wing section 12 from the sea water. Accordingly, the speed and the direction are adjusted by the control section 17 based on the position information of the probe body 11 acquired by the position information acquiring section 16 and position information of a measurement point which is a predetermined condition, and thus, it is possible to cause the probe body 11 to perform self-contained navigation toward the measurement point. Then, the control section 17 controls the sensor section 13 to measure the electromagnetic field, to thereby make it possible to perform exploration (resource exploration).

The measurement result of the electromagnetic field is transmitted to an external device through the antenna 22 after the ocean exploration apparatus 10 is lifted up to the sea level S. Here, the position information at the measurement point is also transmitted together with the measurement result. In the example shown in FIG. 4, the control section 17 performs the measurement of the electromagnetic field at plural measurement points, and then, transmits the measurement result and position information at each measurement point.

As described above, according to the ocean exploration apparatus 10 and the ocean exploration method according to the present embodiment, it is possible to obtain the following effects.

Since the OBEM in the related art is dropped on the ocean bottom B from a ship to measure an electromagnetic field at a fixed measurement point, the degree of freedom in measurement is greatly limited. However, the glider type AUV (ocean exploration apparatus 10) proposed by the present inventors is mounted with an electromagnetic field sensor (sensor section 13) therein, and thus, movement of the sensor on the ocean bottom B is possible. Further, it takes a long period of time for dropping and recovery work of the OBEM. However, in the sensor mounted AUV (ocean exploration apparatus 10) proposed by the present inventors, measurement can be performed while moving over plural measurement points, and thus, its work efficiency is considerably enhanced.

That is, since the probe body 11 can perform self-contained navigation toward a measurement point, it is possible to greatly increase the degree of freedom in measurement. Further, as one ocean exploration apparatus 10 moves between plural measurement points, it is possible to measure electromagnetic fields of plural measurement points with only one ocean exploration apparatus 10. Accordingly, it is possible to realize efficient exploration.

Further, since the sensor section 13 includes the MI sensor 23, it is possible to increase the sensitivity of a low frequency magnetic field while achieving reduction in weight, for example, compared with a case where the sensor section 13 includes the induction coil instead of the MI sensor 23.

Further, since the wing section 12 forms the glider type, it is possible to reduce energy necessary for the wing section 12 to receive the lifting force, for example, compared with a case where a propeller type instead of the glider type is used.

Further, since at least part of the arm 24 overlaps the wing section 12 in the vertical direction, it is possible to protect the arm 24 in the vertical direction by the wing section 12, and to enhance reliability of the ocean exploration apparatus 10 while securing the size of the wing section 12. As described in the present embodiment, when the arm 24 is disposed along the lower surface of the wing section 12, it is possible to easily secure gliding performance due to the wing section 12.

Further, since the position information acquiring section 16 acquires the position and direction of the probe body 11 as position information, it is possible to cause the probe body 11 to perform self-contained navigation with high accuracy, and to acquire the direction of the probe body 11 at a measurement point, to thereby measure an electromagnetic field with high accuracy.

(Second Embodiment)

Figure 5:
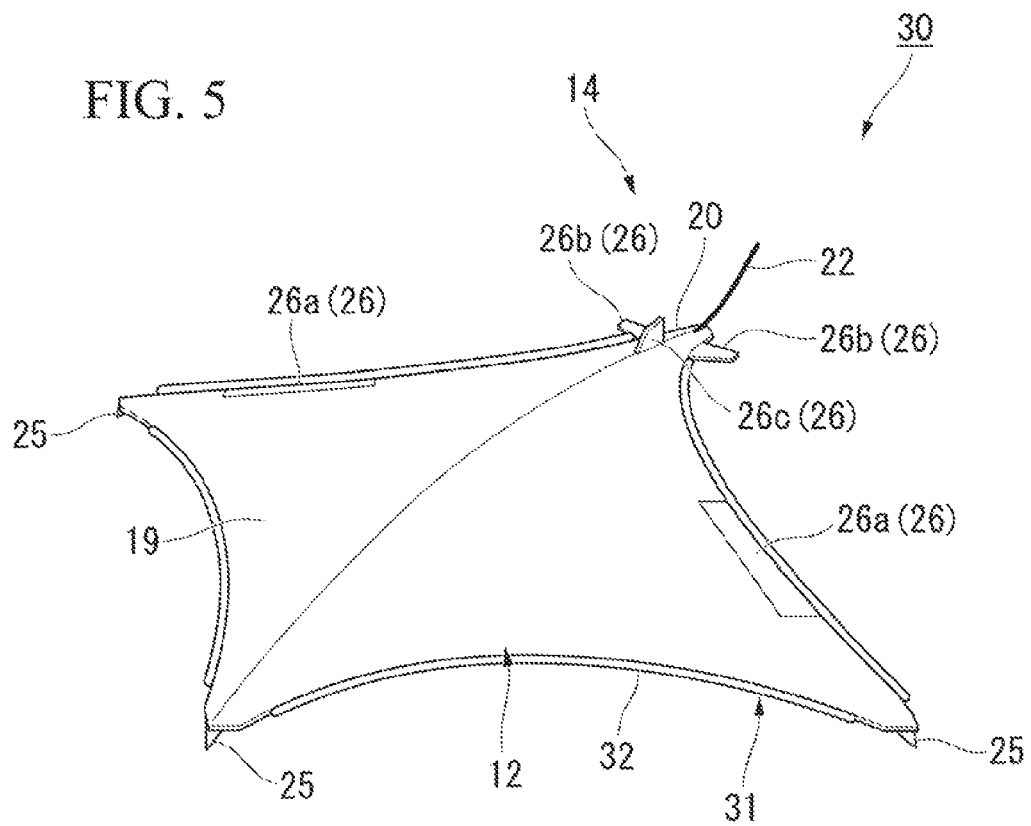
FIG. 5 is a top perspective view of an ocean exploration apparatus according to a second embodiment of the invention.

Next, an ocean exploration apparatus 30 according to a second embodiment of the invention will be described with reference to FIG. 5.

In the second embodiment, the same reference numerals are given to the same sections as the components in the first embodiment, description thereof will not be repeated, and only different points will be described.

The ocean exploration apparatus 30 according to the present embodiment further includes a transmitting section 31 that transmits electromagnetic waves. The transmitting section 31 includes an oscillation circuit 32 that extends in the circumferential direction to surround an outer peripheral edge of the wing section 12 over the entire periphery, and transmits electromagnetic waves toward the ocean bottom B in a state where the ocean exploration apparatus 30 is grounded on the ocean bottom B. Thus, it is possible to forcibly generate fluctuation in electromagnetic waves on the ocean bottom B, and to measure the fluctuation by the sensor section 13. Such measurement of the electromagnetic waves is effective in a case where resources are disposed in a relatively shallow range (for example, about several hundred meters) from the ocean bottom B. When resources are disposed in a relatively deep range (for example, about several kilometers), as described in the first embodiment, the method for measuring electromagnetic waves on the ocean bottom B without transmitting the electromagnetic waves toward the ocean bottom B is effective.

The preferable embodiments of the invention have been described, but the invention is not limited to the embodiments. Additions, omissions, replacements, and other modifications of components are possible in a range without departing from the spirit of the invention. The invention is not defined by the above description, but is defined only by the scopes of appended claims.

For example, in the above-described embodiments, a measurement result of an electromagnetic field is transmitted to an external device through the antenna 22 after the ocean exploration apparatus 10 is lifted up on the sea surface, but the invention is not limited thereto. For example, after the measurement is finished, and after the ocean exploration apparatus 10 is recovered, a measurement result of an electromagnetic field and positional information of a measurement point may be directly read from the apparatus.

In the above-described embodiments, the arm 24 is covered by the wing section 12 from above over the entire length thereof but the invention is not limited thereto. For example, the tip portion of die arm 24 may protrude from the wing section 12 in the horizontal direction. Further, the arm 24 may be disposed above the wing section 12. For example, the arm 24 may be disposed along an upper surface of the wing section 24, and may be fixed to the upper surface. The invention may include other appropriate modification examples in which at least part of the arm 24 overlaps the wing section 12 in the vertical direction.

What is claimed is:

1. An ocean exploration apparatus comprising:
   a probe body;
   a buoyancy adjusting section that adjusts buoyancy generated in the probe body;
   a posture adjusting section that adjusts a posture of the probe body;
   a position information acquiring section that acquires position information of the probe body;
   a wing section that moves the probe body using a lifting force applied from seawater;
   a sensor section that is provided in the probe body and measures an electromagnetic field; and
   a control section that controls operations of the buoyancy adjusting section, the posture adjusting section, the position information acquiring section, and the sensor section according to predetermined conditions, wherein the wing section is formed by a membrane and covers the probe body from above, the wing section has a main wing that is curved upward to form a convex spherical shape, an accommodating space, in which at least one part of the probe body is accommodated, is formed under the main wing, the sensor section detects the electromagnetic field through an electrode provided at an endpoint of an arm that protrudes from the probe body in a horizontal direction, at least a part of the arm overlaps the wing section in a vertical direction, and the arm is disposed along a lower surface of the wing section and is fixed to the lower surface.

2. The ocean exploration apparatus according to claim 1, wherein the sensor section includes an MI sensor.

3. The ocean exploration apparatus according to claim 1, wherein the wing section is formed as a glider type.

4. The ocean exploration apparatus according to claim 1, wherein the position information acquiring section acquires a position and a direction of the probe body as the position information.

5. An ocean exploration method for measuring an electromagnetic field on an ocean bottom using the ocean exploration apparatus according to claim 1, the method comprising:

adjusting a velocity and a direction where the probe body moves in the sea by the lifting force applied to the wing section from the seawater and causing the probe body to perform self-contained navigation toward a measurement point, by controlling the buoyancy adjusting section and the posture adjusting section by the control section, and measuring the electromagnetic field by controlling the sensor section by the control section after the probe body performs the self-contained navigation to the measurement point and in grounded on the ocean bottom, wherein in performing the self-contained navigation, the velocity and the direction are adjusted based on the position information of the probe body acquired by the position information acquiring section and position information of the measurement point which is a predetermined condition.

6. The ocean exploration apparatus according to claim 1, further comprising a transmitting section that transmits electromagnetic waves, wherein the transmitting section includes an oscillation circuit that extends in a circumferential direction which is a turning direction around the probe body in a planar view to surround an outer peripheral edge of the wing section over the entire periphery.

\* \* \* \* \*